US012593105B2

(12) United States Patent
Zhou et al.

(10) Patent No.: US 12,593,105 B2
(45) Date of Patent: Mar. 31, 2026

(54) COMMENT PROCESSING METHOD, ELECTRONIC DEVICE AND NON-TRANSITORY COMPUTER-READABLE STORAGE MEDIUM

(71) Applicant: Beijing Youzhuju Network Technology Co., Ltd., Beijing (CN)

(72) Inventors: Pei Zhou, Beijing (CN); Runfu Lin, Beijing (CN); Changcong Li, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/730,746

(22) PCT Filed: Jan. 19, 2023

(86) PCT No.: PCT/CN2023/073253
§ 371 (c)(1),
(2) Date: Jul. 19, 2024

(87) PCT Pub. No.: WO2023/138671
PCT Pub. Date: Jul. 27, 2023

(65) Prior Publication Data
US 2025/0106479 A1 Mar. 27, 2025

(30) Foreign Application Priority Data

Jan. 20, 2022 (CN) .......................... 202210068587.4

(51) Int. Cl.
| | |
|---|---|
| *H04N 21/4788* | (2011.01) |
| *H04N 21/2187* | (2011.01) |
| *H04N 21/254* | (2011.01) |

(52) U.S. Cl.
CPC ..... *H04N 21/4788* (2013.01); *H04N 21/2187* (2013.01); *H04N 21/2542* (2013.01)

(58) Field of Classification Search
CPC ........... H04N 21/4788; H04N 21/2187; H04N 21/2542; H04N 21/488; H04N 21/4884;
(Continued)

(56) References Cited

U.S. PATENT DOCUMENTS

| | | | | |
|---|---|---|---|---|
| 2006/0075039 A1* | 4/2006 | Narayanaswami | .. | G06Q 10/107 |
| | | | | 709/206 |
| 2019/0394146 A1* | 12/2019 | Wang | ................... | H04N 21/252 |

(Continued)

FOREIGN PATENT DOCUMENTS

| | | |
|---|---|---|
| CN | 110290403 A | 9/2019 |
| CN | 110765313 A | 2/2020 |

(Continued)

OTHER PUBLICATIONS

ISA China National Intellectual Property Administration, International Search Report Issued in Application No. PCT/CN2023/073253, Apr. 18, 2023, WIPO, 9 pages.

(Continued)

*Primary Examiner* — Kyu Chae
(74) *Attorney, Agent, or Firm* — Alleman Hall LLP

(57) ABSTRACT

The present disclosure relates to a comment processing method and apparatus, and an electronic device, a computer-readable storage medium and a computer program. The comment processing method includes: acquiring real-time comment information for a live room; determining a similarity between a target real-time comment in the real-time comment information and historical comments in a historical comment set corresponding to the live room; when the
(Continued)

Acquiring real-time comment information for a live room — S101

Determining a similarity between a target real-time comment in the real-time comment information and historical comments in a historical comment set corresponding to the live room — S102

When the similarity between the target real-time comment and a target historical comment is greater than or equal to a first preset threshold value, merging the target real-time comment and the target historical comment, wherein the target historical comment is any historical comment among the historical comments in the historical comment set, and the target real-time comment is any real-time comment in the real-time comment information — S103

Displaying a merged target real-time comment and target historical comment — S104 similarity between the target real-time comment and a target historical comment is greater than or equal to a first preset threshold value, combining the target real-time comment and the target historical comment, wherein the target historical comment is any historical comment among the historical comments in the historical comment set, and the target real-time comment is any real-time comment in the real-time comment information; and displaying a combined target real-time comment and target historical comment.

20 Claims, 5 Drawing Sheets

(58) Field of Classification Search
CPC ......... Y02D 10/00; G06F 16/33; G06F 18/22; G06F 40/30; G06F 16/3344; G06N 3/04; G06N 3/08
See application file for complete search history.

(56) References Cited

U.S. PATENT DOCUMENTS

| | | | | |
|---|---|---|---|---|
| 2020/0250248 | A1* | 8/2020 | Yu | ......................... G06F 16/951 |
| 2023/0067819 | A1* | 3/2023 | Dawson | ................ H04L 51/046 |

FOREIGN PATENT DOCUMENTS

| | | | |
|---|---|---|---|
| CN | 111460221 | A | 7/2020 |
| CN | 306129586 | S | 10/2020 |
| CN | 112131346 | A | 12/2020 |
| CN | 112347764 | A | 2/2021 |
| CN | 112765990 | A | 5/2021 |
| CN | 113377960 | A | 9/2021 |

OTHER PUBLICATIONS

China National Intellectual Property Administration, Office Action Issued in Application No. 202210068587.4, Dec. 4, 2025, 23 pages.

* cited by examiner

COMMENT PROCESSING METHOD, ELECTRONIC DEVICE AND NON-TRANSITORY COMPUTER-READABLE STORAGE MEDIUM

CROSS-REFERENCE TO RELATED APPLICATIONS

The present application is a national stage application of International Patent Application No. PCT/CN2023/073253, filed on Jan. 19, 2023 which claims priority of the Chinese Patent Application No. 202210068587.4, filed on Jan. 20, 2022, the disclosures of both of which are incorporated herein by reference in their entireties as part of the present application.

TECHNICAL FIELD

The embodiments of the present disclosure relate to the technical field of computer processing, in particular to a comment processing method and a device.

BACKGROUND

The use of an electronic device by a user is usually the use of various applications of the electronic device. For example, for the use of live-streaming applications, the streamer can conduct live-streaming by a streamer terminal, and control the live-streaming by a live-streaming control terminal, and a viewer can watch the live-streaming by the viewer terminal. The viewer can also input the comment content for the live-streaming by the viewer terminal. The streamer can view and manage the comment content by the live-streaming control terminal.

SUMMARY

The embodiments of the present disclosure provide a comment processing method and device.

In a first aspect, the embodiments of the present disclosure provide a comment processing method, which includes:

acquiring real-time comment information for a live room;

determining a similarity between a target real-time comment in the real-time comment information and historical comments in a historical comment set corresponding to the live room;

when the similarity between the target real-time comment and a target historical comment is greater than or equal to a first preset threshold value, combining the target real-time comment and the target historical comment, wherein the target historical comment is any historical comment among various historical comments in the historical comment set, and the target real-time comment is any real-time comment in the real-time comment information; and displaying a combined target real-time comment and target historical comment.

In a second aspect, the embodiments of the present disclosure provide a comment processing apparatus, which includes a real-time comment acquisition module, a similarity determination module, a comment combine module, and a display module.

The real-time comment acquisition module is configured to acquire real-time comment information for a live room.

The similarity determination module is configured to determine a similarity between a target real-time comment in the real-time comment information and historical comments in a historical comment set corresponding to the live room.

The comment combine module is configured to, when the similarity between the target real-time comment and a target historical comment is greater than or equal to a first preset threshold value, combine the target real-time comment and the target historical comment, wherein the target historical comment is any historical comment among historical comments in the historical comment set, and the target real-time comment is any real-time comment in the real-time comment information.

The display module is configured to display a combined target real-time comment and target historical comment.

In a third aspect, the embodiments of the present disclosure provide an electronic device, which includes at least one processor and a memory.

The memory is configured to store computer executable instructions.

At least one processor is configured to execute the computer executable instructions stored in the memory to cause the electronic device implement the method as described in the first aspect.

In a fourth aspect, the embodiments of the present disclosure provide a computer-readable storage medium for storing computer executable instructions that, when executed by a processor, cause a computing device to implement the method as described in the first aspect.

In a fifth aspect, the embodiments of the present disclosure provide a computer program used to implement the method as described in the first aspect.

In a sixth aspect, the embodiment of the present disclosure provides a computer program product comprising computer instructions that, when executed by a processor, implement the method as described in the first aspect.

The embodiments of the present disclosure provide a comment processing method and device. The method includes: acquiring real-time comment information for a live room; determining a similarity between a target real-time comment in the real-time comment information and historical comments in a historical comment set corresponding to the live room; when the similarity between the target real-time comment and a target historical comment is greater than or equal to a first preset threshold value, combining the target real-time comment and the target historical comment, wherein the target historical comment is any historical comment among various historical comments in the historical comment set, and the target real-time comment is any real-time comment in the real-time comment information; and displaying a combined target real-time comment and target historical comment.

BRIEF DESCRIPTION OF DRAWINGS

To describe the solutions of the embodiments of the present disclosure or in the prior art more clearly, the accompanying drawings required in the description of the embodiments or the prior art will be briefly described in the following. Obviously, the drawings in the following description are some of embodiments of the present disclosure, and other drawing(s) can also be derived from these drawings without any inventive work, for those skilled in the art.

DETAILED DESCRIPTION

In order to make the purpose, technical solutions and advantages of the embodiments of the present disclosure clearer, the technical solutions in the embodiments of the present disclosure will be clearly and completely described below in conjunction with the accompanying drawings in the embodiments of the present disclosure. Obviously, the embodiments described are part of the embodiments of the present disclosure, instead of all embodiments. Based on the embodiments of the present disclosure, all other embodiments obtained by those skilled in the art without inventive work, fall within the scope of protection of the present disclosure.

Figure 1:
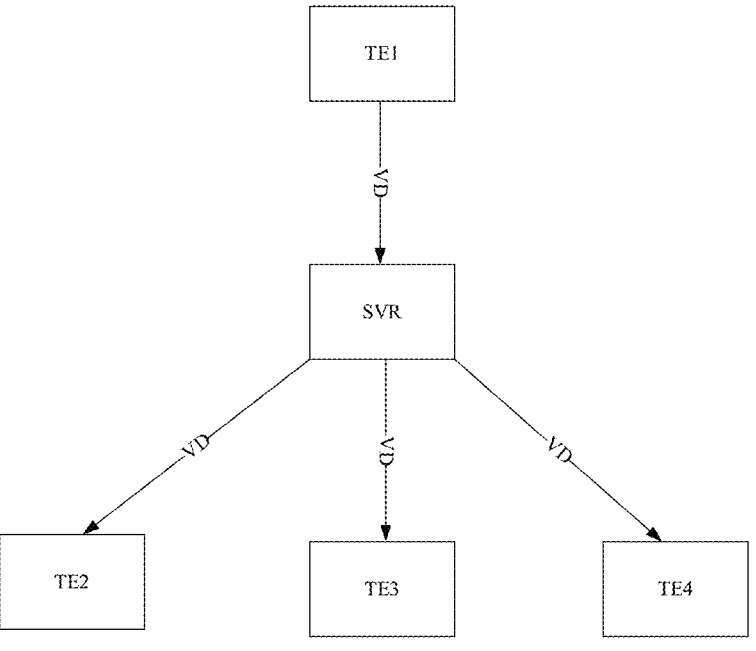
FIG. 1 is a schematic diagram of the transmission of video data in a video live-streaming scenario to which an embodiment of the present disclosure is applicable.

The embodiment of the present disclosure may be applied to a video live-streaming scenario. During the video live-streaming, one or more streamers communicate with one or more viewers through video, each streamer uses a streamer terminal, and each viewer uses a viewer terminal. During a live-streaming, the live room is opened by the streamer, and the viewer terminal may access the live room and interact with the streamer of the live room. FIG. 1 is a schematic diagram of the transmission of video data in a video live-streaming scenario to which an embodiment of the present disclosure is applicable. FIG. 1 illustrates four terminal devices, i.e., TE1, TE2, TE3, and TE4, and a server, i.e., SVR. The TE1 is a streamer terminal and the TE2, TE3, and TE4 are the viewer terminals corresponding to the three viewers respectively. During a video live-streaming, the TE1 enters the video data (VD) of the streamer, and sends the VD to the SVR. The SVR sends the VD to the TE2, TE3, and TE4 respectively. The TE2, TE3, and TE4 parse and play the VD after receiving the VD sent by the SVR, so that viewers can see the streamer, the items exhibited by the streamer, and the environment where the streamer is located.

In the above-mentioned video live-streaming scenario, the said viewers can post comment contents for the live-streaming using the viewer terminal. The comment contents can be displayed on the live-streaming control terminal in real time, so that the streamer can view and manage the comments.

When a quantity of the said comments is large, and there is a large number of repeated comments, the real-time comment information displayed on the live-streaming control terminal is refreshed quickly, resulting in a large number of repeated comments be seen and other comments to be ignored, so that the streamer unable to read more comment contents, thus reducing the reading efficiency of the streamer.

In the above-mentioned live-streaming process, how to avoid the streamer from ignoring parts of the comment content, allow the streamer to read more comment contents, and improve the reading efficiency of the streamer, is a problem needed to be solved.

In order to solve the problems mentioned above, the embodiments of the present disclosure may combine similar comment contents by virtue of similarity, to avoid the displayed comment contents being repeated and to avoid the streamer from ignoring parts of the comment content, so that the streamer is allowed to read more comment contents, thus improving the reading efficiency of the streamer.

The technical solutions of the embodiment of the present disclosure and how the technical solutions of the present disclosure solve the above-mentioned technical problems are described in detail with specific embodiments below. The following specific embodiments may be combined with each other, and the same or similar concepts or processes may not be repeated in some embodiments. An embodiment of the present disclosure is described below in conjunction with the accompanying drawings.

Figure 2:
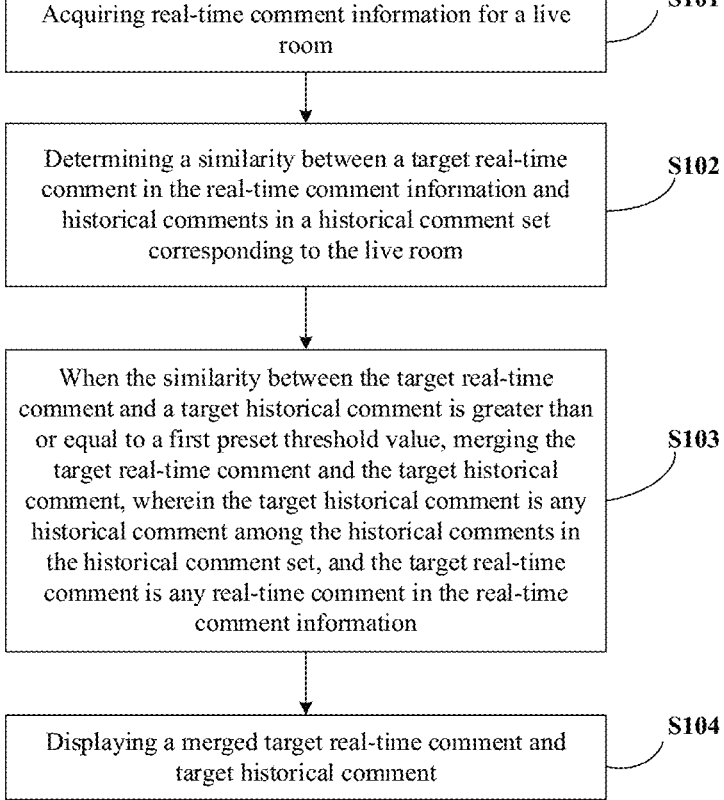
FIG. 2 is a flowchart of steps of a comment processing method provided in an embodiment of the present disclosure.

FIG. 2 is a flowchart of steps of a comment processing method provided in the embodiment of the present disclosure. The method illustrated in FIG. 2 may be applied to the live-streaming control side. As illustrated in FIG. 2, the comment processing method includes S101-S104.

S101: acquiring real-time comment information for a live room.

The real-time comment information refers to the comment information to be displayed.

It is understandable that the real-time comment information here is sent by the viewer terminal to the live-streaming control terminal and the streamer terminal in real time.

S102: determining a similarity between a target real-time comment in the real-time comment information and historical comments in a historical comment set corresponding to the live room.

The similarity refers to the semantic similarity. The higher the semantic similarity is, the closer the semantic of the target real-time comment and the semantic of historical comments.

In the embodiment of the present disclosure, the said similarity is determined based on a preconfigured similar semantic model, and the similar semantic model is a neural network model. The inputs to the similar semantic model are the target real-time comment and the historical comments.

The said similar semantic model is obtained pre-trained using a large number of training samples. The training samples may include two comment samples, and a label that indicates whether the two comment samples are semantically similar. Thus, the training process of the similar semantic model may be iterated in multiple rounds, and in each iteration:

Firstly, the probability that the two comment samples are semantically similar is predicted according to the similar semantic model. That is, for each training example, the two comment samples are input into the untrained similar semantic model to obtain the probability that the two comment samples are semantically similar. Thus, such a probability can be obtained for each training sample.

Then, a loss value is determined according to the probability and label that the two comment samples are semantically similar. In response to the loss value not satisfying a convergence condition, the parameters of the similar semantic model are adjusted according to the loss value, and the next iteration is performed until the loss value satisfies the convergence condition.

The loss value is obtained by inputting the probability and label corresponding to a large number of training samples into a loss function. The loss function may adopt any existing loss function, for example, the cross-entropy loss function, mean square error loss function, etc., which is not limited in the embodiment of the present disclosure.

It can be seen that the embodiment of the present disclosure may determines the repeated comment contents by virtue of semantics, instead of determining the repeated comment contents through whether the words are the same. As such, the repeated comments that are not exactly the same in words but semantically similar can be identified and be combined, which allows to identify the repeated comments as much as possible, reduce the displaying space occupied by the repeated comments, and thus providing more displaying space for the other comments, thereby avoiding the streamer from ignoring other comment contents as much as possible.

S103: when the similarity between the target real-time comment and a target historical comment is greater than or equal to a first preset threshold value, combining the target real-time comment and the target historical comment, wherein the target historical comment is any historical comment among the historical comments in the historical comment set, and the target real-time comment is any real-time comment in the real-time comment information.

The combining here may be understood as determining the target real-time comment and the target historical comment as a comment group, so that only one comment content in the comment group is displayed, instead of displaying each comment content in the comment group. As such, the space occupied by comments on the comment interface is reduced, so that more other comments can be displayed on the comment interface, thereby facilitating streamer to see more comments, and thus avoiding the streamer from ignoring the comments.

S104: displaying a combined target real-time comment and target historical comment.

Specifically, in the case where a sum of a quantity of the target real-time comment and a quantity of the target historical comment in the combined target real-time comment and target historical comment is less than or equal to a second preset threshold value, the target real-time comment is displayed in a second comment area of the comment interface; otherwise, the target real-time comment is not displayed in the second comment area. The target real-time comment and the target historical comment may be comments with different contents, i.e., the displayed contents are different.

Of course, in the case where the similarity between the target real-time comment and anyone of historical comment is smaller the first preset threshold value, there is no target real-time comment with semantic similarity to the historical comment, so there is no need to combine comments, so that the target real-time comment is displayed in the second comment area.

In an embodiment, in response to the sum of the quantity of the target historical comment and the target real-time comment with the similarity being greater than or equal to the first preset threshold value being greater than or equal to the second preset threshold value, the combined target real-time comment and target historical comment is displayed in the second comment area of the comment interface. That is, when the quantity of similar comments in the comment group is greater than or equal to the second preset threshold value, the combined target real-time comment and target historical comment is displayed in the second comment area of the comment interface. The comments in the real-time comment information other than the target real-time comment are displayed in a first comment area of the comment interface.

In an embodiment, when the quantity of similar comments in the comment group is greater than or equal to the second preset threshold value, the real-time comment information is displayed in the second comment area and the first comment area of the comment interface.

The second comment area is used to display some latest real-time comment information. When the second comment area is full, the earliest comment content is moved out of the second comment area. As such, the real-time comments displayed in the second comment area are some or all of the comments in the live room.

In the prior art, when the real-time comment information is acquired, the real-time comment information is directly displayed in the second comment area. As such, when there is a large number of the repeated comments, the comment content displayed in the second comment area is the same, repeated comment contents, and other comments cannot be seen.

The embodiment of the present disclosure may perform the similarity matching on the real-time comment information and the historical comments, to identify repeated comment content that are semantically similar, and display up to the second preset threshold value of the repeated comment content that are semantically similar in the second comment area, which greatly reduces the repeated comment content in the second comment area, saves the displaying space of the second comment area, and allows the second comment area to display more other comments, which is helpful to avoid the streamer from ignoring some comments, and improve the reading efficiency of the streamer for comments.

In addition, in addition to the second comment area mentioned above, there is the first comment area also in the comment interface, so that the combined target real-time comment and target historical comment may be displayed in the first comment area. From the foregoing illustration, the combined target real-time comment and target historical comment forms a comment group, i.e., the comment group includes multiple similar comments (the comments whose similarity is greater than the preset threshold value), so that the reference comment content in the comment group may be displayed in the first comment area, and the reference comment content may be any comment content of the comment group, i.e., the reference comment content may be the target real-time comment or a target historical comment.

It is understandable that the reference comment content displayed in the first comment area represents the repeated comment contents, and each reference comment content represents a type of the repeated comment contents that belong to the same comment group.

It should be noted that, when combining the above-mentioned target real-time comment and the target historical comment into a comment group, the quantity of target real-time comment and the target historical comment after combining is required to be determined, that is, the quantity of comments included in the comment group, and the appropriate reference comment content is selected. Thus, the combined quantity and the reference comment content after combining are displayed in the first comment area of the comment interface, that is, the reference comment content and the quantity of comments included in the comment group are displayed.

Optionally, the reference comment content may be the earliest comment content in the comment group. As such, each time a real-time comment information is received, although the real-time comment information belongs to the comment group, the reference comment content of the comment group does not need to be updated, which is helpful to alleviate the performance degradation caused by constantly refreshing the comment area.

Optionally, the reference comment content may also be the latest comment content in the comment group. As such, each time a real-time comment information is received, in the case where the real-time comment belongs to the comment group, the real-time comment may be displayed in the first comment area as a new reference comment content for the comment group.

The embodiment of the present disclosure may, in the above way, allow the streamer to see the latest comment content in each comment group, which is helpful to increase the attention of the most recent repeated comment content. In addition, the embodiment of the present disclosure may also display the reference comment content of the target comment group to which the most recent received real-time comment information belongs at the top of the first comment area. As the target comment group is the comment group to which the currently received real-time comment information belongs, this can further prioritize the streamer to see the most recent, repeated comment content in the live room.

It can be seen that the embodiment of the present disclosure implements the displaying of the comment content through the second comment area and the first comment area. In practical application, the comment interface of the live room may include multiple tab pages, and each tab page displays different comment content. For example, the first tab page is used to display all the comment contents, the second tab page is used to display the comment contents for the items that have been purchased, the third tab page is used to display the consultation comments, and the fourth tab page is used to display the comment contents from the viewers who are following the streamer.

It can be seen that, in addition to the first tab page, the comment contents in the other tab pages are parts of the comment contents filtered out according to certain conditions, so the quantity of the comments to be displayed is relatively less. Thus, in the tab page with a large number of comments to be displayed, the use of the method of embodiment of the present disclosure can better avoid the streamer from ignoring the comment contents.

Figure 4:
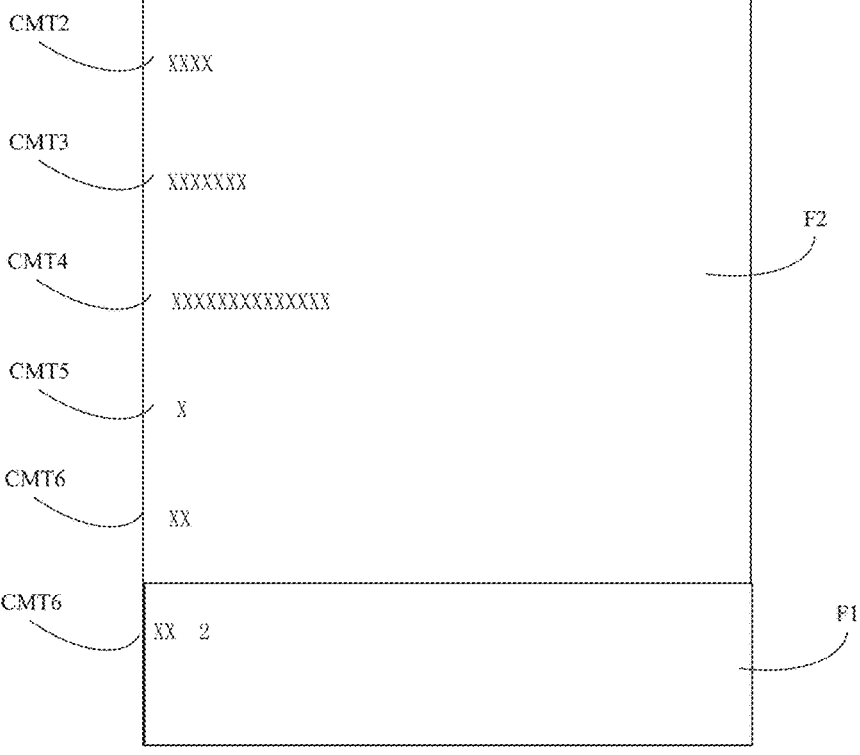
Figure 5:
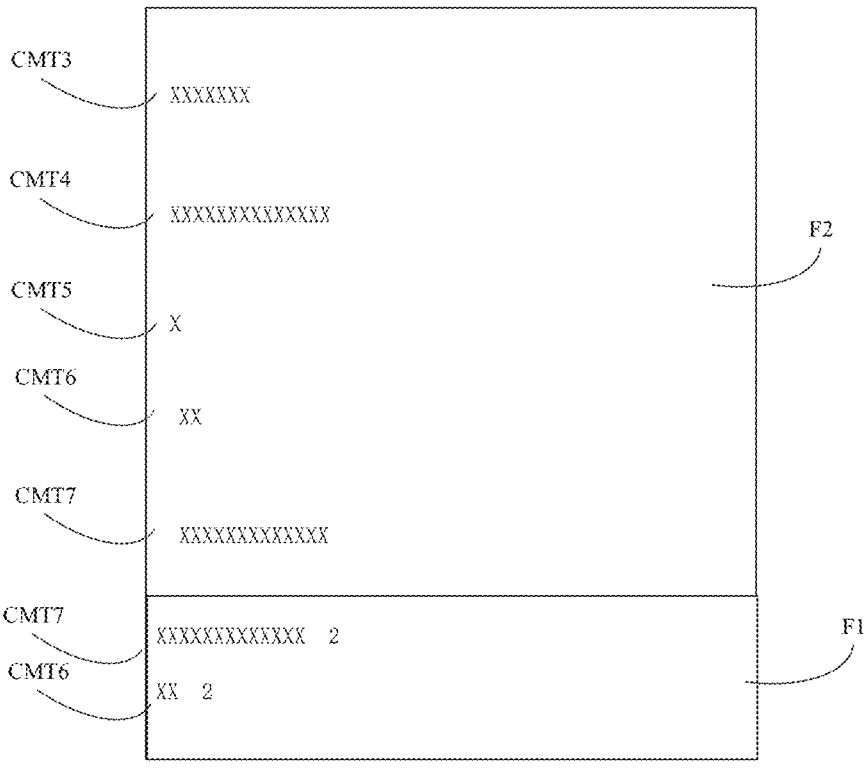
Figure 6:
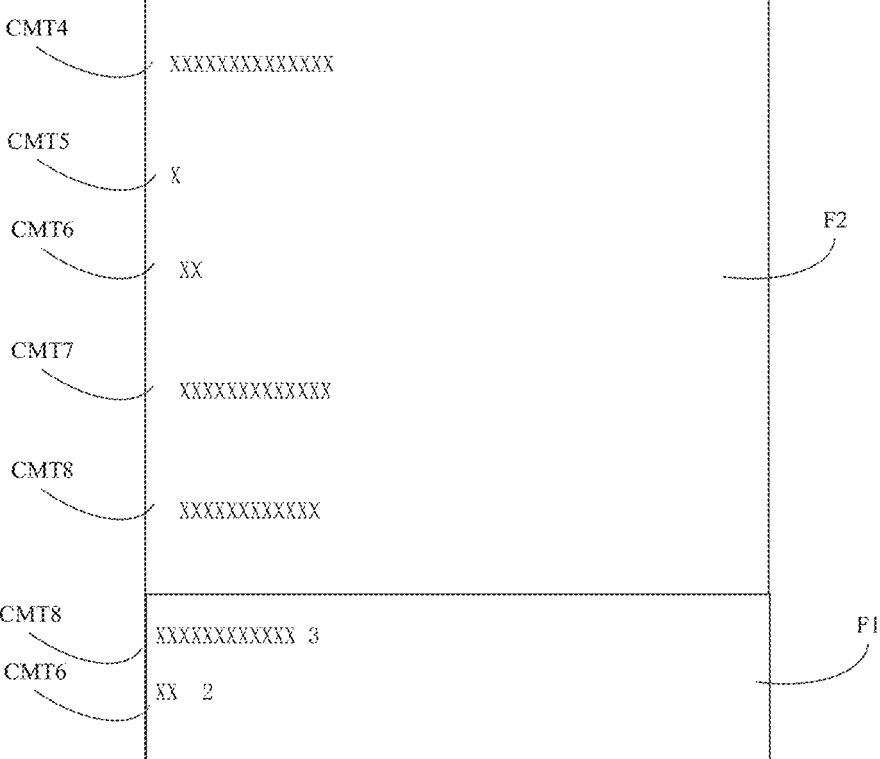

Referring to FIG. 4 to FIG. 6, the first comment area F1 not only displays the reference comment content of the comment group, but also displays the quantity of the comments included in the comment group. For example, as illustrated in FIG. 5, the number "2" next to CMT6 in the first comment area F1 is the quantity of the comments included in the comment group to which the CMT6 belongs, and the number "2" next to CMT7 in the first comment area F1 is the quantity of the comments included in the comment group to which the CMT7 belongs.

To clearly represent the correspondence relationship between the reference comment content and the quantity of the comments in the comment group to which the reference comment content belongs, a preset quantity of display positions may be set in the first comment area, and each of the display positions may correspond to a comment group and is used to display the reference comment content in the comment group and the quantity of the comments included in the comment group. For example, as illustrated in FIG. 4 to FIG. 6, a line in the first comment area F1 is a display position, thus the line is used to display the reference comment content in a comment group and the quantity of the comments in the comment group. In the case where the reference comment content and the quantity of comments exceed one line, the reference comment content may be collapsed to display, so that the reference comment content and the quantity of comments can be displayed in one line.

The relationship between the second comment area and the first comment area in the embodiment of the present disclosure may include anyone of the following: the second comment area and the first comment area being adjacent, and the first comment area being superimposed on the second comment area.

When the second comment area and the first comment area are adjacent, the second comment area and the first comment area do not affect each other, and do not occlude each other.

As illustrated in FIG. 4 to FIG. 6, when the first comment area F1 is superimposed on the second comment area F2, the first comment area F1 may occlude part of the second comment area F2. Thus, the size of the second comment area may be set to be larger, even to be the entire screen, to display as much real-time comment information as possible. Moreover, the first comment area does not display comments when there is no comment group, thus reducing the occlusion of the first comment area to the second comment area as much as possible.

In the embodiment of the present disclosure, the first comment area is superimposed on the second comment area. In the case where the first comment area is displayed, a part of the comment contents in the second comment area is occluded. To avoid the part of the comment contents in the second comment area being occluded, the first comment area does not display comments when no comment content needs to be displayed in the first comment area. As such, the occlusion of the first comment area to the second comment area can be reduced as much as possible, thereby displaying more real-time comment information as much as possible.

The said first comment area may be superimposed on any position of the second comment area. For example, the first comment area is superimposed on the top, middle, etc., of the second comment area, which is not limited to the bottom illustrated in FIG. 4 to FIG. 6.

The process of displaying the reference comment content in the said first comment area needs to be performed according to the following information: the states of the first comment area, and the comment group corresponding to the reference comment content in the first comment area. The states of the first comment area may include: comments are not displayed and comments being displayed.

When comments are not displayed in the first comment area, in the case where the acquired real-time comment information and at least one historical comment in the live room belong to the target comment group, the first comment area needs to be displayed first, and then the reference comment content of the target comment group is displayed at the top of the first comment area.

Figure 3:
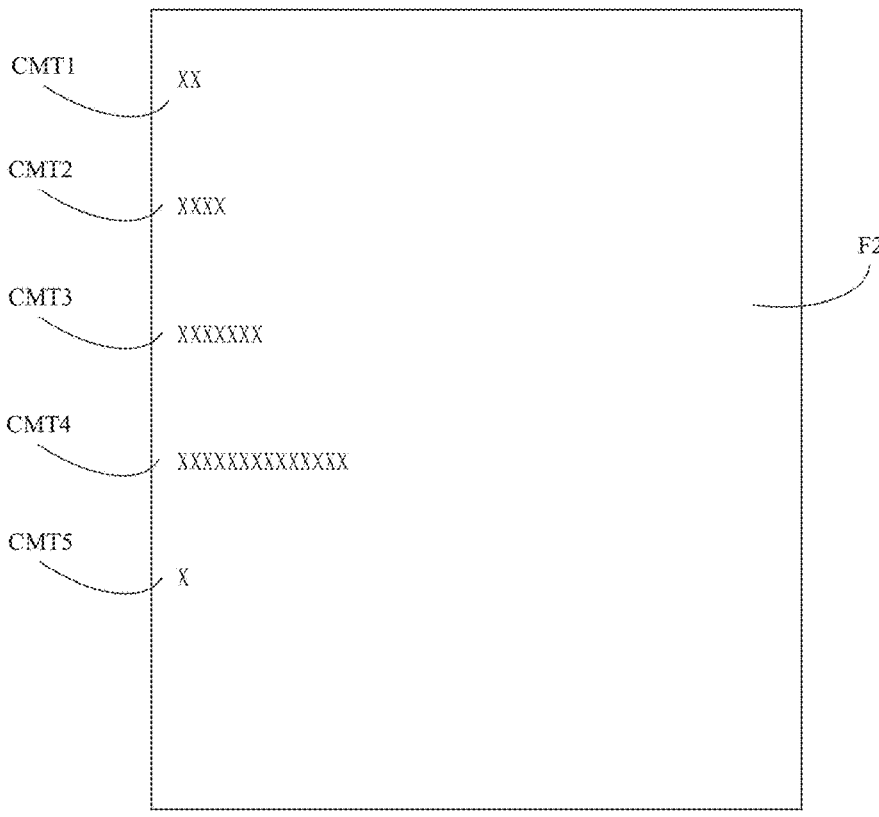
FIG. 3 to FIG. 6 are schematic diagrams of four comment displaying areas provided in an embodiment of the present disclosure.

FIG. 3 is a schematic diagram of a comment area displaying provided in the embodiment of the present disclosure. As illustrated in FIG. 3, the comment interface of the live room only displays the second comment area F2. In the case where a real-time comment information CMT6 is acquired at the moment, and the CMT6 and the CMT5 in the second comment area F2 belong to the same target comment group G1, a result for comment display illustrated in FIG. 4 can be obtained. As illustrated in FIG. 4, the comment interface of the live room not only displays the second comment area F2, but also displays the first comment area F1, and the top of the F1 displays the reference comment content CMT6 of the target comment group G1.

In addition, when the second preset threshold value is 3, according to S104, as the real-time comment information CMT6 and the historical comment CMT5 in the second comment area F2 belong to the target comment group G1, and the quantity of 2 of comment contents included in the target comment group G1 is smaller than the preset threshold value of 3, as illustrated in FIG. 4, the second comment area F2 also displays the CMT6 simultaneously, and the comment content CMT1 at the top of the second comment area F2 in FIG. 3 is moved out of the second comment area.

It is understandable that when comments are not displayed in the first comment area, it indicates that there are no historical comments that are semantically similar, and the semantics of the comment contents in the second comment area are different. When comments are displayed in the first comment area, it indicates that there are historical comments that are semantically similar, but due to the limited quantity of comments that can be displayed in the second comment area, the comment contents that are semantically similar may or may not be displayed in the second comment area.

It should be noted that, in FIG. 4, the latest comment content CMT6 in the comment group G1, is served as a reference comment content, as an example.

When the first comment area being displayed, in the case where the acquired real-time comment information and at least one historical comment in the live room belong to the target comment group, and the reference comment content of the target comment group is not displayed in the first comment area, after moving at least one reference comment content existed in the first comment area down in sequence, the reference comment content of the target comment group is displayed at the top of the first comment area, and the quantity of the comments in the target comment group is increased by 1.

For example, when the real-time comment information CMT7 is acquired, in the case where the CMT7 and the historical comment CMT4 in the second comment area F2 in FIG. 4 belong to the target comment group G2, and the reference comment content of the G2 is not displayed in the first comment area F1 in FIG. 4, the reference comment content CMT6 existed in the first comment area F1 in FIG. 4 can be moved down in sequence, and the reference comment content CMT7 of the G2 is displayed at the top of the first comment area F1, so that a result for comment display illustrated in FIG. 5 can be obtained.

In addition, when the second preset threshold value is 3, according to S104, as the real-time comment information CMT7 and the historical comment CMT4 in the second comment area belong to the target comment group G2, and the quantity of 2 of comment contents included in the target comment group G2 is smaller than the preset threshold value of 3, as illustrated in FIG. 5, the second comment area F2 also displays the CMT7 simultaneously, and the comment content CMT2 at the top of the second comment area F2 in FIG. 4 is moved out of the second comment area.

It should be noted that when the reference comment content is the latest comment content in the comment group, the reference comment content of the target comment group may also be updated to the real-time comment information. When the reference comment content is the earliest comment content in the comment group, the reference comment content of the target comment group is not required to be updated. In FIG. 5, the latest comment content in the comment group is served as the reference comment content.

It is understandable that, in the case where the quantity of the reference comments in the first comment area is equal to the maximum quantity of display positions that can be accommodated in the first comment area, the reference comment content currently at the bottom of the first comment area is moved out of the first comment area. In the case where the quantity of the reference comments in the first comment area is smaller than the maximum quantity of display positions that can be accommodated in the first comment area, the reference comment content currently at the bottom of the first comment area is not moved out of the first comment area.

When the first comment area being displayed, in the case where the acquired real-time comment information and at least one historical comment in the live room belong to the target comment group, and the reference comment content of the target comment group is displayed in the first comment area, the quantity of the comments included in the target comment group is updated in the first comment area, and the reference comment content and the corresponding quantity of the comments in the target comment group are moved to the top of the first comment area, and the quantity of the comments in the target comment group is increased by 1.

For example, when the real-time comment information CMT8 is acquired, in the case where the CMT8 and the historical comments CMT4 and CMT7 in the second comment area F2 in FIG. 5 belong to the target comment group G2, and the reference comment content of G2 is displayed in the first comment area F1 in FIG. 5, the quantity of 2 of the comments corresponding to the reference comment content CMT7 of G2 in FIG. 5 can be updated to 3, and a result for comment display illustrated in FIG. 6 can be obtained.

In addition, when the second preset threshold value is 3, according to S104, as the real-time comment information CMT8 and the historical comments CMT4 and CMT7 in the second comment area belong to the target comment group G2, and the quantity of 3 of comment contents included in the target comment group G2 is equal to the preset threshold value 3, as illustrated in FIG. 6, the second comment area F2 also displays the CMT8 simultaneously, and the comment content CMT3 at the top of the second comment area F2 in FIG. 5 is moved out of the second comment area.

It should be noted that when the reference comment content is the latest comment content in the comment group, the reference comment content of the target comment group may be updated to the real-time comment information. When the reference comment content is the earliest comment content in the comment group, the reference comment content of the target comment group is not required to be updated. It should be noted that the latest comment content in the comment group is served as the reference comment content in FIG. 6.

It can be seen from the process of displaying the said first comment area, the process of displaying needs to depend on historical comments. In the embodiment of the present disclosure, all the historical comments form a historical comment set stored in a buffer pool, which may be understood as a buffer of a computer. Thus, after acquiring each real-time comment information, it not only needs to display the real-time comment information according to the above-mentioned process of displaying, but also to add the real-time comment information into the buffer pool, so that when the real-time comment information is acquired again in the future, the real-time comment information is displayed according to the historical comments in the buffer pool.

In the embodiment of the present disclosure, the buffer pool is periodically emptied. Specifically, the historical comment set in the buffer pool is emptied when a preset time period is reached. For example, empties every minute.

It is understandable that after the buffer pool is emptied, and before the real-time comment information is obtained during the current time period T, there is no historical comment, and thus there is no comment group. At the moment, the first comment area can be no longer displayed, or the first comment area can be continued to be displayed.

In the case where the first comment area is no longer displayed, when the comment contents received during the current time period T form a comment group, the first comment area is redisplayed. Each reference comment content in the first comment area is the comment content acquired during the current time period, and the quantity of the comments in the first comment area is the quantity of the comments included in the comment group composed of the comment contents acquired during the current time period.

In the case where the first comment area is continued to be displayed, the first comment area may display a preset duration, such as 3 seconds. In the case where the comment contents received during the current time period T do not form a comment group after the preset duration, the first comment area is no longer displayed. The first comment area is redisplayed until the comment contents received during the current time period T form the comment group. Each reference comment content in the first comment area is the comment content acquired during the current time period, and the quantity of the comments in the first comment area is the quantity of the comments included in the comment group composed of the comment contents acquired during the current time period.

It is understandable that the similarity between the comment contents in the said comment group is greater than or equal to the first preset threshold value.

Optionally, a plurality of comment type identifications corresponding to a plurality of comment types are displayed on the said comment interface, and users may perform a triggering operation on any comment type identification. Thus, in response to the triggering operation for a target comment type identification corresponding to a target comment type, the comment information corresponding to the target comment type is displayed. The target comment type is any comment type of the plurality of comment types, and the target comment type identification is any comment type identification of the plurality of comment type identifications.

A typical application scenario of the embodiment of the present disclosure is a live-streaming of commodity sales. Here, the live room includes a live room for an object promotion type, so the comment type includes a consultation comment type. Thus, in the live room for the object promotion type, the streamer can switch to the consultation comment, so that the streamer can focus on the consultation comment and avoid missing the consultation comment.

Figure 7:
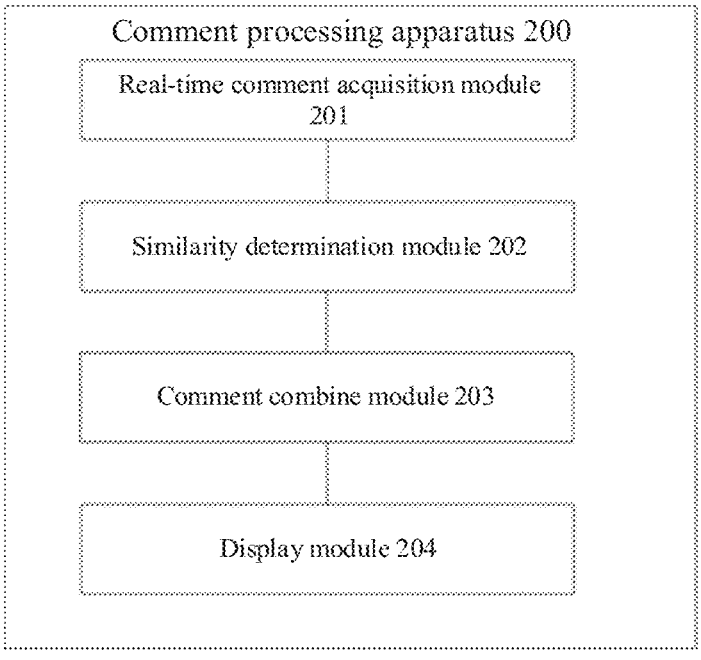
FIG. 7 is a structural block diagram of a comment processing device provided in an embodiment of the present disclosure.

FIG. 7 is a structural block diagram of a comment processing device provided in the embodiment of the present disclosure that is applied to the said live-streaming control terminal, corresponding to the comment processing method of the aforementioned embodiment. For illustrative purposes, the parts that are relevant to the embodiments of the present disclosure are illustrated only. Referring to FIG. 7, the said comment processing device 200 includes a real-time comment acquisition module 201, a similarity determination module 202, a comment combine module 203, and a display module 204.

The real-time comment acquisition module 201 is configured to acquire real-time comment information for a live room.

The similarity determination module 202 is configured to determine a similarity between a target real-time comment in the real-time comment information and historical comments in a historical comment set corresponding to the live room.

The comment combine module 203 is configured to, when the similarity between the target real-time comment and a target historical comment is greater than or equal to a first preset threshold value, combine the target real-time comment and the target historical comment, wherein the target historical comment is any historical comment among historical comments in the historical comment set, and the target real-time comment is any real-time comment in the real-time comment information.

The display module 204 is configured to display a combined target real-time comment and target historical comment.

Optionally, the display module 204 is further configured to:

display the combined target real-time comment and target historical comment in the second comment area of the comment interface; in the case where a sum of a quantity of the target real-time comment and a quantity of the target historical comment in the combined target real-time comment and target historical comment is less than or equal to a second preset threshold value, display the target real-time comment in the second comment area of the comment interface.

Optionally, the device further includes a comment type display module, and a comment information display module.

The comment type display module is configured to display a plurality of comment type identifications corresponding to a plurality of comment types on the comment interface.

The comment information display module is configured to, in response to a triggering operation for a target comment type identification corresponding to a target comment type, display the comment information corresponding to the target comment type in the comment interface. The target comment type is any comment type of the plurality of the comment types, and the target comment type identification is any comment type identification of the plurality of the comment type identifications.

Optionally, the comment combine module 203 is further configured to:

when the similarity between the target real-time comment and the target historical comment is greater than or equal to the first preset threshold value, determine a quantity of the target real-time comment and the target historical comment being combined and a reference comment content.

The display module 204 is further configured to:

display the quantity of the target real-time comment and the target historical comment being combined in the first comment area of the comment interface.

Optionally, the combined target real-time comment and target historical comment forms a comment group. The first comment area includes a preset quantity of display positions, and each of the display positions corresponds to one comment group, and is used to display the reference comment content of the comment group and the quantity of comments included in the comment group. The reference comment content is any comment in the comment group.

Optionally, the historical comment set is stored in a buffer pool, and the device further includes a buffer pool update module and a buffer pool clean module.

The buffer pool update module is configured to add the real-time comment information to the buffer pool.

The buffer pool clean module is configured to empty the historical comment set in the buffer pool when a preset time period is reached.

Optionally, the similarity is determined by a preconfigured similar semantic model, and the similar semantic model is a neural network model.

Optionally, the live room includes a live room for an object promotion type, and the comment types include a consultation comment type.

The comment processing device provided in the present embodiment may be used to implement the technical solution of the method embodiment illustrated in FIG. 2, and its implementation principle and technical effect are similar, so that of the present embodiment are not repeated here.

Figure 8:
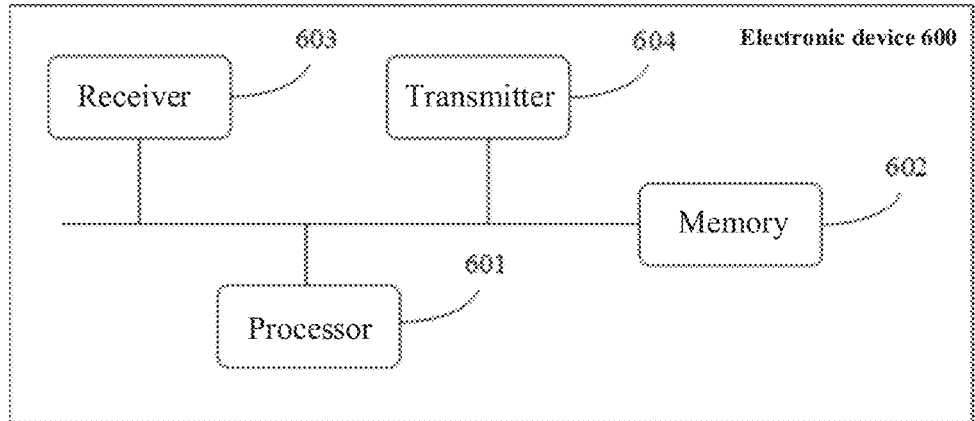
FIG. 8 is a structural block diagram of an electronic device provided in an embodiment of the present disclosure.

FIG. 8 is a structural block diagram of an electronic device 600 provided in the embodiment of the present disclosure. The electronic device 600 includes a memory 602 and at least one processor 601.

The memory 602 is configured to store the computer executable instructions.

The at least one processor 601 is configured to execute the computer executable instructions stored in the memory 602 to causes the electronic device 600 to implement the method in FIG. 2.

In addition, the electronic device may also include a receiver 603 and a transmitter 604. The receiver 603 is configured to receive information from other apparatus or device, and forward to the processor 601. The transmitter 604 is configured to send information to other apparatus or device.

Figure 9:
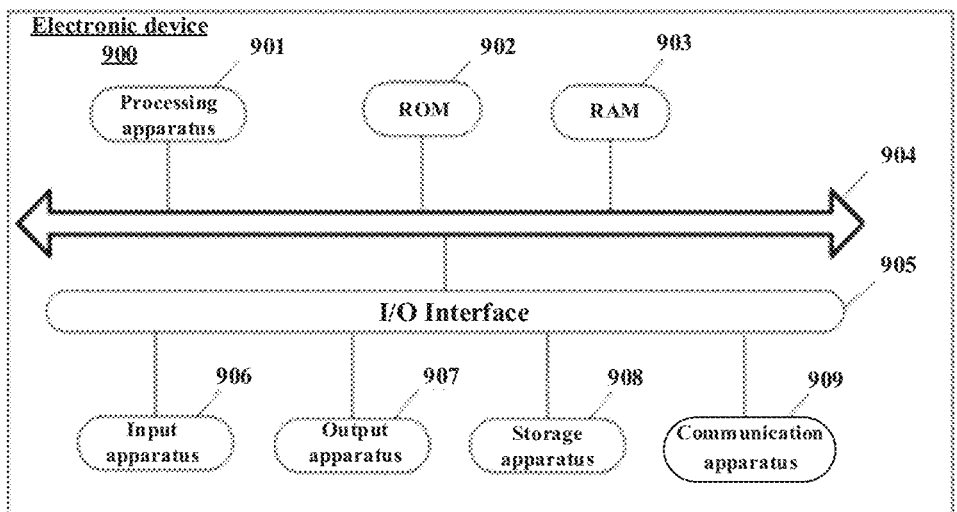
FIG. 9 is a structural block diagram of another electronic device provided in an embodiment of the present disclosure.

Further, referring to FIG. 9, which illustrates the structure schematic diagram of the electronic device 900, which can be a terminal device, adapted to implement the embodiment of the present disclosure. The electronic device 900 may include but not be limited to a mobile terminal such as a mobile phone, a notebook computer, a digital broadcasting receiver, a personal digital assistant (PDA), a Portable Android Device (PAD), a portable multimedia player (PMP), a vehicle-mounted terminal (for example, a vehicle navigation terminal), and a fixed terminal such as a digital television (TV) and a desktop computer. The electronic device illustrated in FIG. 9 is only an example and should not impose any limitations on the functions and application scope of the embodiments of the present disclosure.

As illustrated in FIG. 9, the electronic device 900 may include a processing apparatus (for example, a central processor, and a graphics processor) 901, it may execute various appropriate actions and processes according to a program stored in a read-only memory (ROM) 902 or a program loaded from a storage 908 to a random access memory (RAM) 903. In RAM 903, various programs and data required for operations of the electronic device 900 are also stored. The processing apparatus 901, ROM 902, and RAM 903 are connected to each other via a bus 904. An input/output (I/O) interface 905 is also connected to the bus 904.

Typically, the following apparatuses may be connected to the I/O interface 905: an input apparatus 906 including, for example, a touch screen, a touchpad, a keyboard, a mouse, a camera, a microphone, an accelerometer, and a gyroscope; an output apparatus 907 including, for example, a liquid crystal display (LCD), a loudspeaker, and a vibrator; a storage 908 including, for example, a magnetic tape, and a hard disk drive; and a communication apparatus 909. The communication apparatus 909 may allow the electronic device 900 to communicate wirelessly or wired with other devices to exchange data. Although FIG. 9 illustrates the electronic device 900 with various apparatuses, it should be understood that it is not required to implement or have all the apparatuses shown. Alternatively, it may implement or have the more or less apparatuses.

Specifically, according to the embodiment of the present disclosure, the process described above with reference to the flowchart may be implemented as a computer software program. For example, an embodiment of the present disclosure includes a computer program product, which includes a computer program carried on a computer-readable medium, and the computer program contains a program code for implementing the method shown in the flowchart. In such an embodiment, the computer program may be downloaded and installed from the network by the communication apparatus 909, or installed from the storage 908, or installed from ROM 902. When the computer program is executed by the processing apparatus 901, the above functions defined in the method of the embodiments of the present disclosure are performed.

It should be noted that the above computer-readable medium in the present disclosure may be a computer-readable signal medium, a computer-readable storage medium, or any combinations thereof. The computer-readable storage medium may be, for example, but not limited to, a system, an apparatus or a device of electrical, magnetic, optical, electromagnetic, infrared, or semiconductor, or any combinations of the above. More specific examples of the computer-readable storage medium may include but not be limited to: an electric connector with one or more wires, a portable computer magnetic disk, a hard disk, a Random Access Memory (RAM), a Read-Only memory (ROM), an Erasable Programmable Read Only Memory (EPROM or flash memory), an optical fiber, a portable Compact Disc Read Only Memory (CD-ROM), an optical storage, a magnetic storage or any suitable combinations of the above. In the present disclosure, the computer-readable storage medium may be any tangible medium that contains or stores a program, and the program may be used by an instruction executive system, apparatus or device or used in combination with it. In the present disclosure, the computer-readable signal medium may include a data signal propagated in a baseband or as a part of a carrier wave, which carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a Radio frequency (RF) or the like, or any suitable combinations of the above.

The above-mentioned computer-readable medium may be included in the above-mentioned electronic device, or may also exist alone without being assembled into the electronic device.

The above-mentioned computer-readable medium carries one or more programs that, when the one or more programs are executed by the electronic device, cause the electronic device to implement the method illustrated by the above embodiments.

The computer program code for implementing the operation of the present disclosure may be written in one or more programming languages or combinations thereof, the above programming language includes but is not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the situation involving the remote computer, the remote computer may be connected to the user's computer by any types of networks, including Local Area Network (LAN) or Wide Area Network (WAN), or may be connected to an external computer (for example, connected by using an internet service provider via the Internet).

The flowchart and the block diagrams in the drawings illustrate possible implementations of system architectures, functions, and operations of systems, methods, and computer program products according to various embodiments of the present disclosure. At this point, each block in the flowchart or the block diagram may represent a module, a program segment, or a part of a code, and the module, the program segment, or the part of the code contains one or more executable instructions for implementing the specified logical functions. It should also be noted that in some alternative implementations, the function indicated in the block may also occur in a different order from those indicated in the drawings. For example, two consecutively represented blocks may actually be executed basically in parallel, and sometimes it may also be executed in an opposite order, this depends on the function involved. It should also be noted that each block in the block diagram and/or the flowchart, as well as combinations of the blocks in the block diagram and/or the flowchart, may be implemented by using a dedicated hardware based system that performs the specified function or operation, or may be implemented by using combinations of dedicated hardware and computer instructions.

The involved units described in the embodiments of the present disclosure may be implemented by means of software, or may be implemented by means of hardware. Herein, the name of the unit does not constitute a limitation for the unit itself in some cases. For example, the first acquisition unit can also be described as "a unit that acquires at least two Internet protocol addresses".

The functions described above herein may be at least partially executed by one or more hardware logic components. For example, non-limiting exemplary types of the hardware logic component that may be used include: a Field-Programmable Gate Array (FPGA), an Application Specific Integrated Circuit (ASIC), an Application Specific Standard Parts (ASSP), a System on Chip (SOC), a Complex Programmable Logic Device (CPLD) and the like.

In the context of the present disclosure, the machine-readable medium may be a tangible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, a portable CD-ROM, an optical storage, a magnetic storage, or any suitable combinations of the above.

In a first example of a first aspect, the embodiment of the present disclosure provides a comment processing method, which includes:

acquiring real-time comment information for a live room;

determining a similarity between a target real-time comment in the real-time comment information and historical comments in a historical comment set corresponding to the live room;

when the similarity between the target real-time comment and a target historical comment is greater than or equal to a first preset threshold value, combining the target real-time comment and the target historical comment, wherein the target historical comment is any historical comment among the historical comments in the historical comment set, and the target real-time comment is any real-time comment in the real-time comment information; and displaying a combined target real-time comment and target historical comment.

According to the first example of the first aspect, in a second example of the first aspect, the displaying a combined target real-time comment and target historical comment includes:

displaying the combined target real-time comment and target historical comment in a second comment area of a comment interface;

in a case where a sum of a quantity of the target real-time comment and a quantity of the target historical comment in the combined target real-time comment and target historical comment is less than or equal to a second preset threshold value, displaying the target real-time comment in a second comment area of the comment interface.

According to the second example of the first aspect, in a third example of the first aspect, the method further includes:

displaying a plurality of comment type identifications corresponding to a plurality of comment types on the comment interface;

in response to a triggering operation for a target comment-type identification corresponding to a target comment type, displaying comment information corresponding to the target comment type in the comment interface, wherein the target comment type is any comment type among the plurality of the comment types, and the target comment type identification is any comment type identification among the plurality of the comment type identifications.

According to the second example of the first aspect, in a fourth example of the first aspect, when the similarity between the target real-time comment and a target historical comment is greater than or equal to a first preset threshold value, combining the target real-time comment and the target historical comment includes:

when the similarity between the target real-time comment and the target historical comment is greater than or equal to a first preset threshold value, determining a quantity of the target real-time comment and the target historical comment after being combined and a reference comment content;

the displaying the combined target real-time comment and target historical comment in a first comment area of a comment interface includes:

displaying the quantity of the target real-time comment and the target historical comment after being combined and the reference comment content in the first comment area of the comment interface.

According to the fourth example of the first aspect, in a fifth example of the first aspect, the combined target real-time comment and target historical comment forms a comment group. The first comment area includes a preset quantity of display positions, and each of display positions corresponds to one comment group and is used to display a reference comment content of the comment group and the quantity of comments included in the comment group, and the reference comment content is a comment content of any comment in the comment group.

According to the first to fifth examples of the first aspect, in a sixth example of the first aspect, the historical comment set is stored in a buffer pool, and the method further includes:

adding the real-time comment information to the buffer pool;

emptying the historical comment set in the buffer pool when a preset time period is reached.

According to the first to fifth examples of the first aspect, in a seventh example of the first aspect, the similarity is determined by a preconfigured similar semantic model, and the similar semantic model is a neural network model.

According to the first to fifth examples of the first aspect, in an eighth example of the first aspect, the live room includes a live room for an object promotion type, and the comment types include a consultation comment type.

In a first example of the second aspect, a comment processing apparatus is provided, which includes a real-time comment acquisition module, a similarity determination module, a comment combine module, and a display module.

The real-time comment acquisition module is configured to acquire real-time comment information for a live room.

The similarity determination module is configured to determine a similarity between a target real-time comment in the real-time comment information and historical comments in a historical comment set corresponding to the live room.

The comment combine module is configured to, when the similarity between the target real-time comment and a target historical comment is greater than or equal to a first preset threshold value, combine the target real-time comment and the target historical comment; wherein the target historical comment is any historical comment among the historical comments in the historical comment set, and the target real-time comment is any real-time comment in the real-time comment information.

The display module is configured to display a combined target real-time comment and target historical comment.

According to the first example of the second aspect, in a second example of the second aspect, the display module is further configured to:

display the combined target real-time comment and target historical comment in the second comment area of the comment interface;

in the case where a sum of a quantity of the target real-time comment and a quantity of the target historical comment in the combined target real-time comment and target historical comment is less than or equal to a second preset threshold value, display the target real-time comment in the second comment area of the comment interface.

According to the second example of the second aspect, in a third example of the second aspect, the apparatus further includes a comment type display module, and a comment information display module.

The comment-type display module is configured to display a plurality of comment type identifications corresponding to a plurality of comment types on the comment interface.

The comment information display module is configured to, in response to a triggering operation for a target comment type identification corresponding to a target comment type, display the comment information corresponding to the target comment type in the comment interface, wherein the target comment type is any comment type of the plurality of the comment types, and the target comment type identification is any comment-type identification of the plurality of the comment type identifications.

According to the second example of the second aspect, in a fourth example of the second aspect, the comment combine module is further configured to:

when the similarity between the target real-time comment and the target historical comment is greater than or equal to a first preset threshold value, determine a quantity of the target real time comment and the target historical comment after being combined and a reference comment content.

The display module is further configured to:

display the quantity of the target real-time comments and the target historical comment after being combined and the reference comment content in the first comment area of the comment interface.

According to the fourth example of the second aspect, in a fifth example of the second aspect, the combined target real-time comment and target historical comment forms a comment group. The first comment area includes a preset quantity of display positions and each of the display positions corresponds to one comment group, and is used to display the reference comment content of the comment group and the quantity of comments included in the comment group. The reference comment content is a comment content of any comment in the comment group.

According to the first to fifth examples of the second aspect, in a sixth example of the second aspect, the historical comment set is stored in a buffer pool, and the apparatus further includes a buffer pool update module and a buffer pool clean module.

The buffer pool update module is configured to add the real-time comment information to the buffer pool.

The buffer pool clean module is configured to empty the historical comment set in the buffer pool when a preset time period is reached.

According to the first to fifth examples of the second aspect, in a seventh example of the second aspect, the similarity is determined by a preconfigured similar semantic model, and the similar semantic model is a neural network model.

According to the first to fifth examples of the second aspect, in an eighth example of the second aspect, the live room includes a live room for an object promotion type, and comment types include a consultation comment type.

In a third aspect, according to one or more embodiments of the present disclosure, an electronic device is provided, which includes at least one processor and a memory.

The memory is configured to store the computer executable instructions.

The at least one processor is configured to execute the computer executable instructions stored in the memory to cause the electronic device to implement the method of any example in the first aspect.

In a fourth aspect, according to one or more embodiments of the present disclosure, a computer-readable storage medium for storing computer executable instructions is provided. The computer executable instructions, when executed by a processor, the computer executable instructions cause a computing device to implement the method of any example in the first aspect.

In a fifth aspect, according to one or more embodiments of the present disclosure, a computer program is provided, which is used to implement the method of any example in the first aspect.

In a sixth aspect, according to one or more embodiments of the present disclosure, there is provided a computer program product comprising computer instructions, which, when executed by a processor, are used for implementing the method of any one of the first aspects.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical solutions formed by mutually replacing the above features with technical features with similar functions disclosed in this disclosure (but not limited to).

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims.

What is claimed is:

1. A comment processing method, comprising:
   acquiring real-time comment information for a live room;
   determining a similarity between a target real-time comment in the real-time comment information and historical comments in a historical comment set corresponding to the live room;
   when the similarity between the target real-time comment and a target historical comment is greater than or equal to a first preset threshold value, combining the target real-time comment and the target historical comment, wherein the target historical comment is any historical comment among the historical comments in the historical comment set, and the target real-time comment is any real-time comment in the real-time comment information; and
   displaying a combined target real-time comment and target historical comment,
   wherein the displaying the combined target real-time comment and target historical comment, comprises:
      displaying the combined target real-time comment and target historical comment in a first comment area of a comment interface; and
      in a case where a sum of a quantity of the target real-time comment and a quantity of the target historical comment in the combined target real-time comment and target historical comment is less than or equal to a second preset threshold value, displaying the target real-time comment in a second comment area of the comment interface.

2. The method according to claim 1, further comprising:
   displaying a plurality of comment type identifications corresponding to a plurality of comment types on the comment interface; and
   in response to a triggering operation for a target comment type identification corresponding to a target comment type, displaying comment information corresponding to the target comment type in the comment interface, wherein the target comment type is any comment type of the plurality of the comment types, and the target comment type identification is any comment type identification of the plurality of the comment type identifications.

3. The method according to claim 2, wherein the live room comprises: a live room for an object promotion type, and the comment types include: a consultation comment type.

4. The method according to claim 2, wherein, when the similarity between the target real-time comment and the target historical comment is greater than or equal to the first preset threshold value, the combining the target real-time comment and the target historical comment, comprises:
   when the similarity between the target real-time comment and the target historical comment is greater than or equal to the first preset threshold value, determining a quantity of the target real-time comment and the target historical comment after being combined and a reference comment content;
   wherein the displaying the combined target real-time comment and target historical comment in the first comment area of the comment interface comprises:
      displaying the quantity of the target real-time comment and the target historical comment being combined and the reference comment content in the first comment area of the comment interface.

5. The method according to claim 2, wherein the similarity is determined by a preconfigured similar semantic model, and the similar semantic model is a neural network model.

6. The method according to claim 1, wherein, when the similarity between the target real-time comment and the target historical comment is greater than or equal to the first preset threshold value, the combining the target real- time comment and the target historical comment, comprises:
   when the similarity between the target real-time comment and the target historical comment is greater than or equal to the first preset threshold value, determining a quantity of the target real-time comment and the target historical comment being combined and a reference comment content;

wherein the displaying the combined target real-time comment and target historical comment in the first comment area of the comment interface comprises:

displaying the quantity of the target real-time comment and the target historical comment being combined and the reference comment content in the first comment area of the comment interface.

7. The method according to claim 6, wherein the combined target real-time comment and target historical comment forms a comment group, the first comment area comprises a preset quantity of display positions, each of the display positions corresponds to one comment group and is used to display a reference comment content of the comment group and a quantity of comments comprised in the comment group, and the reference comment content is a comment content of any comment in the comment group.

8. The method according to claim 1, wherein the historical comment set is stored in a buffer pool, and the method further comprises:

adding the real-time comment information to the buffer pool;

emptying the historical comment set in the buffer pool when a preset time period is reached.

9. The method according to claim 1, wherein the similarity is determined by a preconfigured similar semantic model, and the similar semantic model is a neural network model.

10. The method according to claim 9, wherein the historical comment set is stored in a buffer pool, and the method further comprises:

adding the real-time comment information to the buffer pool; and emptying the historical comment set in the buffer pool when a preset time period is reached.

11. An electronic device, comprising: at least one processor and a memory;

wherein the memory is configured to store computer executable instructions;

wherein the at least one processor is configured to execute the computer executable instructions stored in the memory to cause the electronic device to implement a comment processing method and the comment processing method comprises:

acquiring real-time comment information for a live room;

determining a similarity between a target real-time comment in the real-time comment information and historical comments in a historical comment set corresponding to the live room;

when the similarity between the target real-time comment and a target historical comment is greater than or equal to a first preset threshold value, combining the target real-time comment and the target historical comment, wherein the target historical comment is any historical comment among the historical comments in the historical comment set, and the target real-time comment is any real-time comment in the real-time comment information; and displaying a combined target real-time comment and target historical comment, wherein the displaying the combined target real-time comment and target historical comment, comprises:

displaying the combined target real-time comment and target historical comment in a first comment area of a comment interface; and in a case where a sum of a quantity of the target real-time comment and a quantity of the target historical comment in the combined target real-time comment and target historical comment is less than or equal to a second preset threshold value, displaying the target real-time comment in a second comment area of the comment interface.

12. The electronic device according to claim 11, wherein the comment processing method implemented by the electronic device further comprises:

displaying a plurality of comment type identifications corresponding to a plurality of comment types on the comment interface; and in response to a triggering operation for a target comment type identification corresponding to a target comment type, displaying comment information corresponding to the target comment type in the comment interface, wherein the target comment type is any comment type of the plurality of the comment types, and the target comment type identification is any comment type identification of the plurality of the comment type identifications.

13. The electronic device according to claim 12, wherein the live room comprises: a live room for an object promotion type, and the comment types include: a consultation comment type.

14. The electronic device according to claim 11, wherein when the similarity between the target real-time comment and the target historical comment is greater than or equal to the first preset threshold value, the combining the target real-time comment and the target historical comment, comprises:

when the similarity between the target real-time comment and the target historical comment is greater than or equal to the first preset threshold value, determining a quantity of the target real-time comment and the target historical comment after being combined and a reference comment content;

wherein the displaying the combined target real-time comment and target historical comment in the first comment area of the comment interface comprises:

displaying the quantity of the target real-time comment and the target historical comment being combined and the reference comment content in the first comment area of the comment interface.

15. The electronic device according to claim 14, wherein the combined target real-time comment and target historical comment forms a comment group, the first comment area comprises a preset quantity of display positions, each of display positions corresponds to one comment group and is used to display a reference comment content of the comment group and a quantity of comments comprised in the comment group, and the reference comment content is a comment content of any comment in the comment group.

16. The electronic device according to claim 11, wherein the historical comment set is stored in a buffer pool, and the electronic device further comprises:

a module for adding the real-time comment information to the buffer pool; and a module for emptying the historical comment set in the buffer pool when a preset time period is reached.

17. The electronic device according to claim 11, wherein the similarity is determined by a preconfigured similar semantic model, and the similar semantic model is a neural network model.

18. A non-transitory computer-readable storage medium, wherein the computer-readable storage medium stores computer executable instructions that, when executed by a processor, cause a computing device to implement a comment processing method and the comment processing method comprises:

acquiring real-time comment information for a live room;

determining a similarity between a target real-time comment in the real-time comment information and historical comments in a historical comment set corresponding to the live room;

when the similarity between the target real-time comment and a target historical comment is greater than or equal to a first preset threshold value, combining the target real-time comment and the target historical comment, wherein the target historical comment is any historical comment among the historical comments in the historical comment set, and the target real-time comment is any real-time comment in the real-time comment information; and displaying a combined target real-time comment and target historical comment, wherein the displaying the combined target real-time comment and target historical comment, comprises:

displaying the combined target real-time comment and target historical comment in a first comment area of a comment interface; and in a case where a sum of a quantity of the target real-time comment and a quantity of the target historical comment in the combined target real-time comment and target historical comment is less than or equal to a second preset threshold value, displaying the target real-time comment in a second comment area of the comment interface.

19. The non-transitory computer-readable storage medium of claim 18, wherein the comment processing method further comprises:

displaying a plurality of comment type identifications corresponding to a plurality of comment types on the comment interface; and in response to a triggering operation for a target comment type identification corresponding to a target comment type, displaying comment information corresponding to the target comment type in the comment interface, wherein the target comment type is any comment type of the plurality of the comment types, and the target comment type identification is any comment type identification of the plurality of the comment type identifications.

20. The non-transitory computer-readable storage medium of claim 18, wherein when the similarity between the target real-time comment and the target historical comment is greater than or equal to the first preset threshold value, the combining the target real-time comment and the target historical comment, comprises:

when the similarity between the target real-time comment and the target historical comment is greater than or equal to the first preset threshold value, determining a quantity of the target real-time comment and the target historical comment after being combined and a reference comment content;

wherein the displaying the combined target real-time comment and target historical comment in the first comment area of the comment interface comprises:

displaying the quantity of the target real-time comment and the target historical comment being combined and the reference comment content in the first comment area of the comment interface.

* * * * *